US012689611B2

(12) United States Patent
Heer et al.

(10) Patent No.: US 12,689,611 B2
(45) Date of Patent: Jul. 21, 2026

(54) PRIORITIZATION FOR TIME-DETERMINISTIC FIREWALLS

(71) Applicants: HIRSCHMANN AUTOMATION AND CONTROL GMBH, Neckartenzlingen (DE); HOCHSCHULE ESSLINGEN, Esslingen (DE)

(72) Inventors: Tobias Heer, Frickenhausen (DE); Lukas Bechtel, Stuttgart (DE)

(73) Assignee: Hirschmann Automation and Control GmbH, Neckartenzlingen (DE)

( * ) Notice: Subject to any disclaimer, the term of this patent is extended or adjusted under 35 U.S.C. 154(b) by 32 days.

(21) Appl. No.: 18/833,196

(22) PCT Filed: Feb. 17, 2023

(86) PCT No.: PCT/EP2023/054108
§ 371 (c)(1),
(2) Date: Jul. 25, 2024

(87) PCT Pub. No.: WO2023/156635
PCT Pub. Date: Aug. 24, 2023

(65) Prior Publication Data
US 2025/0158960 A1　May 15, 2025

(30) Foreign Application Priority Data
Feb. 18, 2022　(DE) ......................... 102022103928.5

(51) Int. Cl.
*G06F 21/00* (2013.01)
*H04L 9/40* (2022.01)

(52) U.S. Cl.
CPC ................................ *H04L 63/0227* (2013.01)

(58) Field of Classification Search
CPC ....................... H04L 63/0227; H04L 63/0263
See application file for complete search history.

(56) References Cited

U.S. PATENT DOCUMENTS 6,606,710 B2 * 8/2003 Krishnan ............ H04L 63/0227
726/13
6,760,309 B1 * 7/2004 Rochberger .......... H04L 47/286
370/468

(Continued)

FOREIGN PATENT DOCUMENTS

JP 2003134156 A 5/2003

OTHER PUBLICATIONS

Wüsteney et al ("Impact of Packet Filtering on Time-Sensitive Networking Traffic", 2021 17th IEEE International Conference on Factory Communication Systems (WFCS) pp. 59-66) (Year: 2021).*

(Continued)

*Primary Examiner* — Michael M Lee

(74) *Attorney, Agent, or Firm* — Harness, Dickey & Pierce, P.L.C.; Anthony G. Fussner

(57) ABSTRACT

The invention relates to a method for allowing data packets in a network to arrive at the recipient at definable times. The method requires a firewall in a computer network. Each data packet is processed within the firewall according to filter rules. Each data packet which is transmitted through the firewall to a recipient is assigned a prioritization for processing in the firewall. Each data packet is transmitted after the filter rules have been processed, but this transmission can be interrupted as soon as another data packet with a higher prioritization arrives at the firewall. The data packet, the processing of which was interrupted, is then stored in the buffer for processing at a later time.

14 Claims, 3 Drawing Sheets

(56)                  References Cited

U.S. PATENT DOCUMENTS

Figure 2:
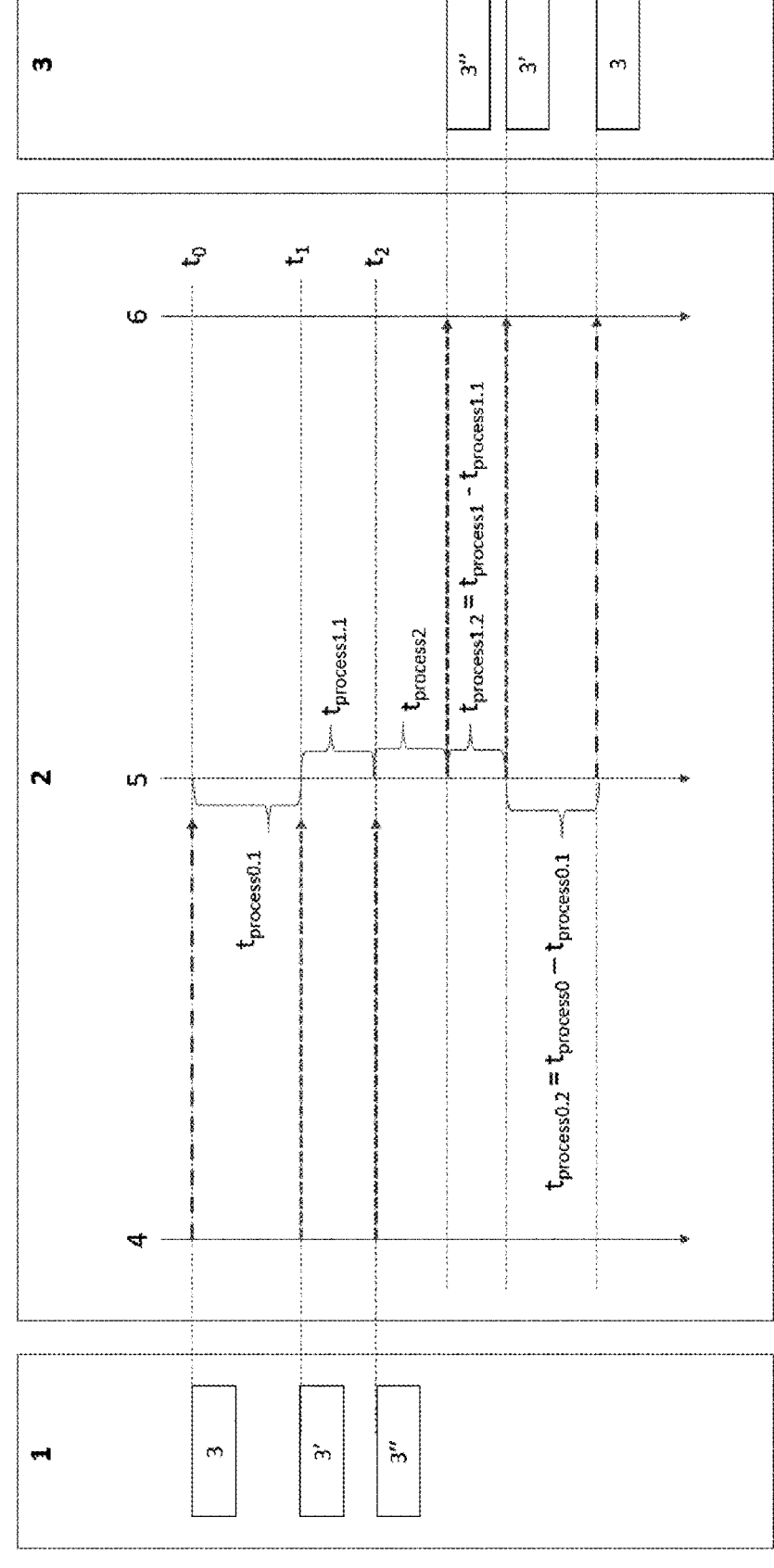

| | | | |
|---|---|---|---|
| 7,143,438 B1* | 11/2006 | Coss | H04L 63/0263 |
| | | | 709/224 |
| 2004/0114516 A1* | 6/2004 | Iwata | H04L 47/2416 |
| | | | 370/230.1 |
| 2006/0195896 A1* | 8/2006 | Fulp | H04L 63/0218 |
| | | | 726/13 |
| 2009/0122699 A1* | 5/2009 | Alperovitch | H04L 45/306 |
| | | | 370/230 |
| 2011/0255543 A1* | 10/2011 | Zhi | G06F 15/17325 |
| | | | 370/394 |
| 2014/0016463 A1 | 1/2014 | Kitada | |
| 2015/0124835 A1* | 5/2015 | McCanne | H04L 47/2441 |
| | | | 370/412 |
| 2021/0117360 A1 | 4/2021 | Kutch et al. | |

OTHER PUBLICATIONS

International Search Report (and its English translation) and Written Opinion for PCT/EP2023/054108 that is the parent application to the instant application; dated May 3, 2023; 12 pages.

* cited by examiner

Fig. 1

PRIORITIZATION FOR TIME-DETERMINISTIC FIREWALLS

This patent application is a U.S. national stage filing under 35 U.S.C. § 371 of PCT International Application No. PCT/EP2023/054108 filed Feb. 17, 2023 (published as WO2023/156635 on Aug. 24, 2023), which claims priority to and the benefit of German Application No. 10 2022 103 928.5 filed Feb. 18, 2022. The entire contents of these applications are incorporated herein by reference.

The present invention relates to a method for realizing prioritizations for time-deterministic firewalls.

Firewalls are required in computer networks for filtering the data packets transmitted in the network and for forwarding or discarding them according to rules.

Packet filters (firewall, switch with ACL rules) examine packets and make decisions based upon a set of rules. The increased volume of real-time traffic means that firewalls must also be able to process packets in real time (i.e., with a specified delay or processing time). The available time budget may be too small for a complete analysis of the packet with regard to all firewall rules. This can depend upon the load on the firewall (for example, firewall takes too long because other computing operations were processed with priority) or upon parallel processes on the firewall (CPU is being used for something else).

Today, firewalls have no time budgets. Therefore, this leads to firewalls forwarding packets with too high a delay/latency, causing time-critical packets to arrive too late at the recipient in the network. A strongly varying processing time also causes problems, since this can lead to intermittent packet processing and the accumulation of packets. Therefore, a constant processing time is advantageous in many cases, in particular for the precise prediction and planning of packet flows in the network.

So far, this problem has not been considered more intensively in the research, since firewalls have not been used in conjunction with time-critical traffic. This invention describes a method for handling this situation.

Therefore, the object of the present invention is to realize a method for ensuring that time-critical packets arrive at the recipient on a timely basis. Accordingly, the invention sets itself the object of presenting a method for time-deterministic firewalls.

This object is achieved by the features of the main claim.

A method with a computer network, a firewall, and a buffer in the firewall is proposed for this purpose.

According to the method, each data packet is initially assigned a prioritization. The data packet is to be transmitted as usual after the filter rules have been fully processed in the firewall.

During the filtering of packets, it can occur that a packet with low prioritization is already located in the filtering process, while a packet with high prioritization arrives at the firewall. In this case, the slow packet delays the processing of the high-priority packet. This can be prevented by using a buffer to interrupt the processing of the slow packet when an urgent packet arrives, and to resume it later.

For this purpose, the firewall monitors the incoming packets and places them in a queue (this is still quite normal behavior). If a high-priority packet is received while a packet with a lower priority is already being filtered, the high-priority packet can be filtered by priority by a) placing it at the front of the queue and b) stopping the processing of the low-priority packet.

The processing of the low-priority data packet is interrupted when a high-priority data packet is received, if filtering is still ongoing. The low-priority packet is then written to a buffer with a note of the last rule tested. Filtering is thereupon aborted. The high-priority packet can now be filtered directly.

Once the high-priority data packet has been finally processed by the firewall, the processing of the low-priority data packet in the buffer can continue.

If further high-priority packets are available, they can also be filtered by priority. Once filtering of all prioritized packets has been completed, the filtering of the low-priority packet can be resumed at the point of interruption. Any time budgets can be taken into account when deciding how long the low-priority packet can be parked in the buffer.

It is also possible to define a rule position, from which no further interruptions are to occur. In this way, it can be avoided that a low-priority packet, which, for instance, is at position 99 of 100 in the processing of rules, is buffered with higher effort due to a single remaining rule.

The prioritization of data packets can be defined as a function of the traffic class of the network (LAN, WAN, etc.). The prioritization can also be defined according to a property of the data packet (size, content, etc.). It is also possible to define the origin or destination (port, network, VLAN, etc.).

Figure 3:
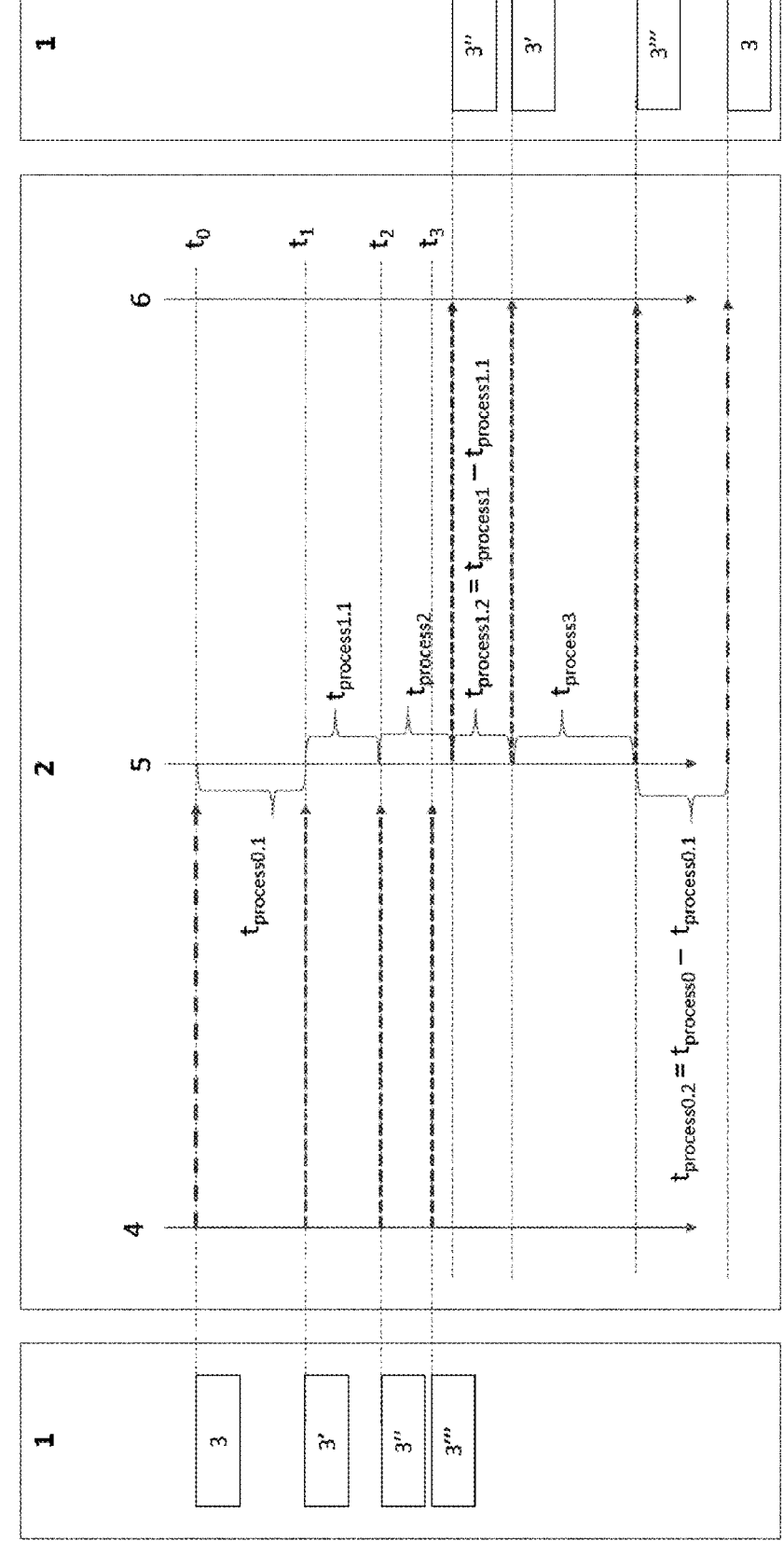

Further features are shown in the attached figures. The following are shown:

Figure 1:
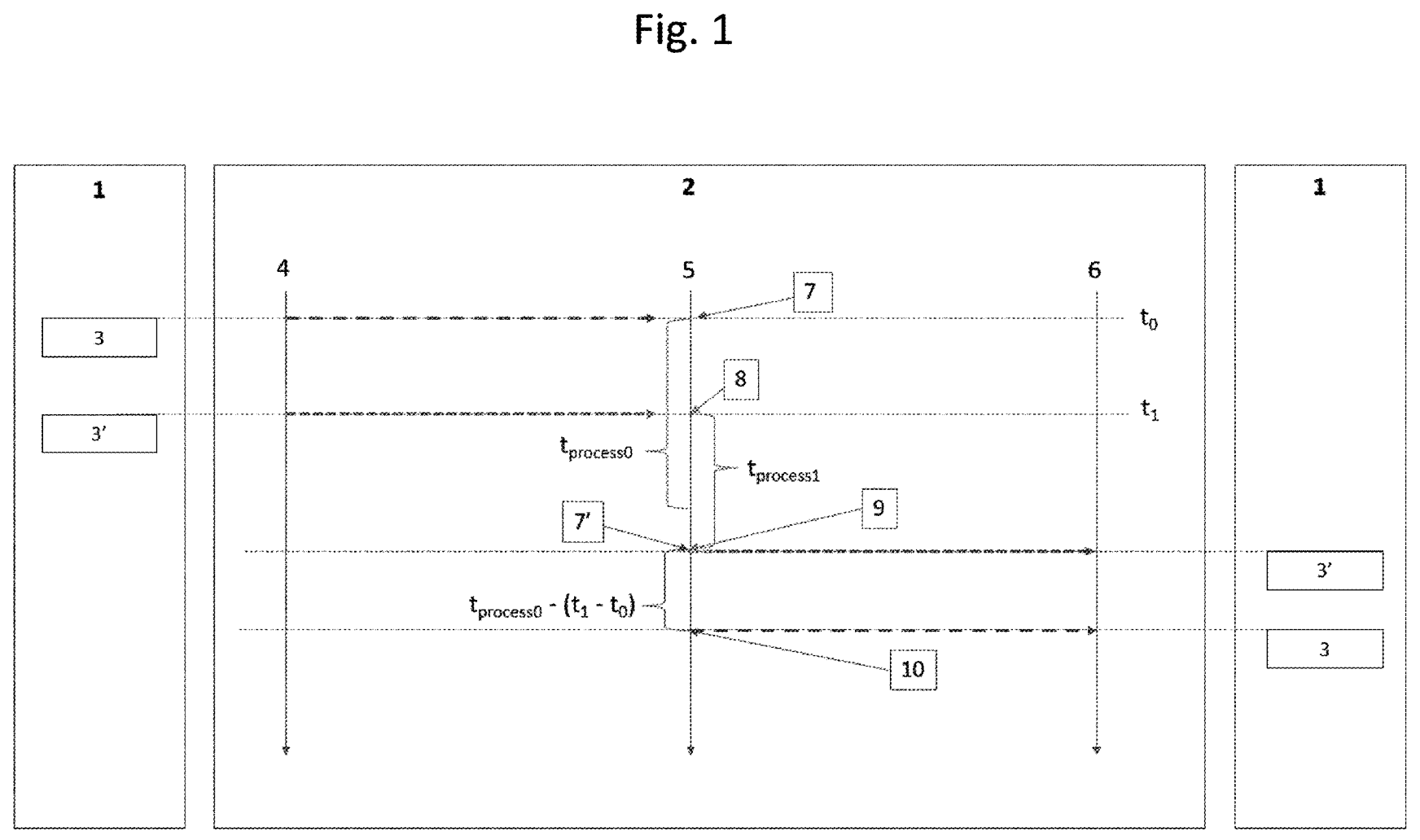

FIG. 1: Time diagram for packet filtering with two differently prioritized data packets;

FIG. 2: Time diagram for packet filtering with three differently prioritized data packets;

FIG. 3: Time diagram for packet filtering with four differently prioritized data packets.

FIG. 1 shows a method according to the invention with a firewall 2 in a network 1. The firewall 2 contains definable rules according to which incoming data packets 3 are examined. Depending upon the result of the examination, a firewall action is subsequently executed, which may involve transmitting the data packets 3 or discarding the data packets 3.

The first data packet 3 arriving at the input 4 of the firewall 2 is forwarded for processing 5. The processing 5 includes working through the rules defined in the firewall. The point in time at which standard processing begins is recorded as the start of processing 7.

Depending upon the workload of the firewall, its performance, and the number of the data packets 3, 3' to be processed, the processing of the filter rules requires a certain amount of time, which can vary and is defined with $t_{process}$. $t_{process0}$ is thus defined for the data packet 3.

According to previous firewalls, a data packet is forwarded to the output 6 of the firewall 2 at the end of processing and thus transmitted to network 1, or the data packet 3 is discarded, depending upon the result of the processing. It would also be conceivable to mark the data packet as a firewall action.

According to the invention, each data packet is now assigned a prioritization for processing in the firewall. This can depend upon the source from which the data packet was transmitted, the destination to which it is to be transmitted, or the class of the network. In an automation network, for example, connected controllers are more time-critical than normal network participants, such as monitoring devices or PC's.

If a data packet 3' with a higher priority than the data packet 3 currently in processing 5 is now received at the input 4 of the firewall 2, the processing 5 of the rules for the data packet 3 with the lower priority is interrupted according to the invention. The processing 5 of the data packet 3 is paused, and the processing 5 of the data packet 3' starts 8.

So that the processing of a data packet 3 can be interrupted and resumed later, it is proposed that a buffer be integrated into the firewall 2. The data packet 3 along with further data packets can be placed here as long as they are not in processing 5.

The processing 5 takes the time $t_{process1}$ for the high-priority data packet 3'. After all rules have been worked through by the processing 5 in the firewall 2 for the data packet 3', the end of processing 9 is reached. According to the result of the processing, a firewall action is now carried out, which can, for example, be the forwarding of the data packet 3' to the output of the firewall 2.

After the high-priority data packet 3' has been worked through, the data packet 3 can now be removed from the buffer and transmitted for further processing 5. For this purpose, the processing 5 is continued at the point 7' where it was aborted. This means that not all rules are now worked through, but only the rules that have not yet been processed. Thus, only the difference in time that is defined by $t_{process0}$ and the processing time previously required for data packet 3 $(t_1 - t_0)$ is now required.

Subsequently, all rules are also processed for the data packet 3, and, according to the result of the processing, a firewall action is now carried out, which can, for example, be the forwarding of the data packet 3 to the output of the firewall 2.

FIG. 2 shows a method according to the invention with a firewall 2 in a network 1, but with three data packets 3, 3', 3'' with increasing priority. The firewall 2 contains definable rules according to which incoming data packets 3 are examined. Depending upon the result of the examination, a firewall action is subsequently executed, which may involve transmitting the data packets 3 or discarding the data packets 3.

The first data packet 3 arriving at the input 4 of the firewall 2 is forwarded for processing 5. The processing 5 includes working through the rules defined in the firewall.

Depending upon the workload of the firewall, its performance, and the number of the data packets 3, 3', 3'' to be processed, the processing of the filter rules requires a certain amount of time, which can vary and is defined with $t_{process}$. $t_{process0}$ designates the processing time for data packet 3.

If a data packet 3' with a higher priority than the data packet 3 currently in processing 5 is now received at the input 4 of the firewall 2, the processing 5 of the rules for the data packet 3 with the lower priority is interrupted according to the invention. The processing 5 of the data packet 3 is paused, and the processing 5 of the data packet 3' starts. The processing time previously required for data packet 3 is defined as $t_{process0.1}$.

So that the processing of a data packet 3 can be interrupted and resumed later, it is proposed that a buffer be integrated into the firewall 2. The data packet 3 along with further data packets can be placed here as long as they are not in processing 5.

The processing 5 takes the time $t_{process1.1}$ for the higher-priority data packet 3'. If a data packet 3'' with a higher priority than the data packet 3' currently in processing 5 is now received at the input 4 of the firewall 2, the processing 5 of the rules for the data packet 3' is interrupted according to the invention. The processing 5 of the data packet 3' is paused, and the processing 5 of the data packet 3'' starts. The processing time previously required for data packet 3' is defined as $t_{process1.1}$.

So that the processing of a data packet 3' can also be interrupted and resumed later, it is proposed that the data packet 3' also be stored in the buffer. The data packet 3' and other data packets can be placed here as long as they are not in processing 5.

After all rules have been worked through by the processing 5 in the firewall 2 for the data packet 3'', the end of processing is reached. According to the result of the processing, a firewall action is now carried out, which can, for example, be the forwarding of the data packet 3'' to the output of the firewall 2. The processing time for data packet 3'' is defined as $t_{process2}$.

After the high-priority data packet 3'' has been worked through, the next-highest-priority data packet 3' can now be removed from the buffer and transmitted for further processing 5. For this purpose, the processing 5 is continued at the point where it was aborted. This means that not all rules are now worked through, but only the rules that have not yet been processed.

Thus, only the difference in time $t_{process1.2}$ that is defined by $t_{process1}$ and the processing time previously required for data packet 3' $t_{process1.1}$ is now required.

Subsequently, all rules are also worked through for the data packet 3', and a firewall action is now carried out according to the result of the processing, which can, for example, be the forwarding of the data packet 3' to the output of the firewall 2.

After the higher-priority data packet 3' has been worked through, the lower-priority data packet 3 can now be removed from the buffer and transmitted for further processing 5. For this purpose, the processing 5 is continued at the point where it was aborted. This means that not all rules are now worked through, but only the rules that have not yet been processed. Thus, only the difference in time $t_{process0.2}$ that is defined by $t_{process0}$ and the processing time previously required for data packet 3 $t_{process0.1}$ is now required.

Subsequently, all rules are also processed for the data packet 3, and, according to the result of the processing, a firewall action is now carried out, which can, for example, be the forwarding of the data packet 3 to the output of the firewall 2.

FIG. 3 shows a method according to the invention with a firewall 2 in a network 1, but with four data packets 3, 3', 3'', 3''' with different priorities. The data packet 3'' is the highest-priority packet, data packet 3' is the next-highest-priority packet, data packet 3''' is the second-lowest-priority packet, and data packet 3 is the lowest-priority packet. The firewall 2 contains definable rules according to which incoming data packets 3 are examined. Depending upon the result of the examination, a firewall action is subsequently executed, which may involve transmitting the data packets 3 or discarding the data packets 3.

The first data packet 3 arriving at the input 4 of the firewall 2 is forwarded for processing 5. The processing 5 includes working through the rules defined in the firewall.

Depending upon the workload of the firewall, its performance, and the number of the data packets 3, 3', 3'', 3''' to be processed, the processing of the filter rules requires a certain amount of time, which can vary and is defined with $t_{process}$. $t_{process0}$ designates the processing time for data packet 3.

If a data packet 3' with a higher priority than the data packet 3 currently in processing 5 is now received at the input 4 of the firewall 2, the processing 5 of the rules for the data packet 3 with the lower priority is interrupted according to the invention. The processing 5 of the data packet 3 is paused, and the processing 5 of the data packet 3' starts. The processing time previously required for data packet 3 is defined as $t_{process0.1}$.

So that the processing of a data packet 3 can be interrupted and resumed later, it is proposed that a buffer be integrated into the firewall 2. The data packet 3 along with further data packets can be placed here as long as they are not in processing 5.

If a data packet 3" with a higher priority than the data packet 3' currently in processing 5 is now received at the input 4 of the firewall 2, the processing 5 of the rules for the data packet 3' with the lower priority is interrupted according to the invention. The processing 5 of the data packet 3' is paused, and the processing 5 of the data packet 3" starts. The processing time previously required for data packet 3' is defined as $t_{process1.1}$.

So that the processing of a data packet 3' can be interrupted and resumed later, it is proposed that the data packet 3 and other data packets be placed in the buffer as long as they are not in processing 5.

If a data packet 3" with a lower priority than the data packet 3" currently in processing 5 is now received at the input 4 of the firewall 2, the processing is not interrupted, and the data packet 3" is stored in the buffer for later processing.

Advantageously, it is proposed that the previous processing times and/or the rules already processed for the data packets be stored in the buffer, in order to be able to determine the rules still to be processed when the data packets are removed from the buffer.

After all rules have been worked through by the processing 5 in the firewall 2 for the data packet 3", the end of processing is reached. According to the result of the processing, a firewall action is now carried out, which can, for example, be the forwarding of the data packet 3" to the output of the firewall 2. The processing time for data packet 3" is defined as $t_{process2}$.

After the high-priority data packet 3" has been worked through, the next-highest-priority data packet 3' can now be removed from the buffer and transmitted for further processing 5. For this purpose, the processing 5 is continued at the point where it was aborted. This means that not all rules are now worked through, but only the rules that have not yet been processed. Thus, only the difference in time $t_{process1.2}$ that is defined by $t_{process1}$ and the processing time previously required for data packet 3' $t_{process1.1}$ is now required.

Subsequently, all rules are also worked through for the data packet 3', and a firewall action is now carried out according to the result of the processing, which can, for example, be the forwarding of the data packet 3' to the output of the firewall 2.

After the data packet 3' has been worked through, the next highest-priority data packet 3" can now be removed from the buffer and transmitted for further processing 5. The processing 5 is for this purpose started from the beginning, since the data packet 3'" has not yet been processed. Thus, full processing time, $t_{process3}$, is now required.

Subsequently, all rules are also worked through for the data packet 3", and, according to the result of the processing, a firewall action is now carried out, which can, for example, be the forwarding of the data packet 3'" to the output of the firewall 2.

After the data packet 3" has been worked through, the lowest-priority data packet 3 can now be removed from the buffer and transmitted for further processing 5. For this purpose, the processing 5 is continued at the point where it was aborted. This means that not all rules are now worked through, but only the rules that have not yet been processed. Thus, only the difference in time $t_{process0.2}$ that is defined by $t_{process0}$ and the processing time previously required for data packet 3 $t_{process0.1}$ is now required.

Subsequently, all rules are also processed for the data packet 3, and, according to the result of the processing, a firewall action is now carried out, which can, for example, be the forwarding of the data packet 3 to the output of the firewall 2.

LIST OF REFERENCE SIGNS

1 Network
2 Firewall
3 Data packet
3' Data packet
3" Data packet
3'" Data packet
4 Input
5 Processing
6 Output
7 Start of processing of 3
7 Continue processing 7
8 Pause of 3, start of processing of 3'
9 End of processing of 3'
10 End of processing of 3

The invention claimed is:

1. A method for allowing a stream of data packets in a network to arrive at a recipient at definable times, with a firewall in a computer network, the firewall including filter rules and a packet buffer in the firewall, the method comprising:

assigning, for each received data packet, a packet-specific, time-aware prioritization that is computed from a target arrival time and a measured arrival-time deviation, the measured arrival-time deviation being a deviation of a measured arrival time and the target arrival time;

processing the filter rules for the data packet in accordance with the time-aware prioritization, wherein processing of the filter rules for a currently processed data packet is preemptively interrupted upon receipt of a further data packet whose time-aware prioritization indicates a strictly smaller arrival-time deviation threshold;

storing, with a preemption tag, the currently processed data packet for which processing was interrupted in the packet buffer together with a record of an unexecuted filter-rule identifiers and a timestamp taken at an input of the firewall; and resuming processing for the stored data packet directly at a first unexecuted filter rule indicated by the preemption tag, and applying a firewall action to the data packet only after the unexecuted filter rules have been processed.

2. The method according to claim 1, wherein the firewall action includes forwarding the data packet to an output of the firewall.

3. The method according to claim 1, wherein the firewall action includes discarding the data packet.

4. The method according to claim 1, wherein the firewall action includes marking the data packet with the preemption tag.

5. The method according to claim 4, wherein the preemption tag encodes the identities of unexecuted filter rules that have not yet been processed by the firewall at the moment of preemption, without advancing packet processing to a subsequent stage.

6. The method according to claim 1, wherein a respective stored data packet is removed from the packet buffer upon resumption and is deleted from the packet buffer only after the firewall action is determined, thereby preventing loss of state associated with the preemption tag.

7. The method according to any claim 1, wherein a timestamp is recorded for each data packet upon arrival at the input of the firewall, and the arrival-time deviation used in the time-aware prioritization is computed from the recorded timestamp and the target arrival time specified for the recipient.

8. The method according to claim 1, wherein data packets stored in the packet buffer are ordered according to their time-aware prioritization, and stored packets having equal prioritization are sub-ordered by input timestamp.

9. The method according to claim 1, wherein the firewall performs time-aware prioritization for each data packet.

10. The method according to claim 1, wherein the time-aware prioritization of each said data packet is carried out by further network participants, without modifying an order of the filter rules of the firewall.

11. The method according to claim 1, wherein the time-aware prioritization is added to the data packet.

12. The method according to claim 1, wherein a plurality of processing operations are carried out simultaneously by the firewall.

13. The method according to claim 12, wherein the interruption of the processing of a data packet takes place if one of the plurality of processing operations is processing a lower-priority data packet.

14. The method according to claim 1, wherein the packet buffer comprises a non-volatile memory.

* * * * *